United States Patent
Yabashi

(10) Patent No.: US 10,243,335 B2
(45) Date of Patent: Mar. 26, 2019

(54) WATER-PROOFING MEMBER

(71) Applicant: Sumitomo Wiring Systems, Ltd., Yokkaichi, Mie (JP)

(72) Inventor: Tomohiro Yabashi, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/792,036

(22) Filed: Oct. 24, 2017

(65) Prior Publication Data

US 2018/0138676 A1 May 17, 2018

(30) Foreign Application Priority Data

Nov. 15, 2016 (JP) ................................ 2016-221980

(51) Int. Cl.
*H02G 3/04* (2006.01)
*B60R 16/02* (2006.01)

(52) U.S. Cl.
CPC ....... *H02G 3/0406* (2013.01); *B60R 16/0215* (2013.01); *H02G 3/0468* (2013.01)

(58) Field of Classification Search
CPC ...... H02G 3/0406; H02G 3/0468; H02G 3/22; H02G 3/0418; H02G 3/24; H02G 3/26; H02G 3/28; H02G 3/30; B60R 16/0215; B60R 16/0222; B60R 16/02
USPC .... 174/95, 650, 653, 68.1, 68.3, 72 A, 74 R, 174/72 C, 88 R, 70 C, 152 G, 153 G, 174/137 R, 17 BA; 248/49, 68.1
See application file for complete search history.

(56) References Cited

U.S. PATENT DOCUMENTS

| | | | |
|---|---|---|---|
| 7,053,311 B2 * | 5/2006 | Santanda | H02G 3/0468 248/74.3 |
| 7,420,125 B2 * | 9/2008 | Tsukamoto | B60R 16/0222 16/2.1 |
| 7,943,854 B1 * | 5/2011 | Lipp | H02G 3/0468 16/2.1 |
| 8,975,524 B2 * | 3/2015 | Kanai (Popovici) | B60R 16/0222 16/2.1 |
| 9,302,635 B2 * | 4/2016 | Han | B60R 16/0215 |
| 9,889,805 B2 * | 2/2018 | Yanazawa | B60R 16/0207 |
| 9,923,348 B2 * | 3/2018 | Sugino | B60R 16/02 |
| 2015/0101842 A1 | 4/2015 | Han et al. | |

FOREIGN PATENT DOCUMENTS

JP 2013241143 A 12/2013

* cited by examiner

*Primary Examiner* — Angel R Estrada
(74) *Attorney, Agent, or Firm* — Reising Ethington, P.C.

(57) ABSTRACT

A water-proofing member includes a pair of elastic tubular connection portions and individually connected in an airtight manner to a connector (housing member) and a corrugated tube (housing member) housing an electrical wire; an elastic tubular insertion portion that surrounds the electrical wire in a mode of connecting the pair of tubular connection portions and to each other; an elastic pipe-shaped extension portion that can be deformed such that its axis is curved, and extends and branches from the outer circumferential surface of the insertion portion; and an air-permeable film that is attached to an extension end portion of the pipe-shaped extension portion.

4 Claims, 4 Drawing Sheets

WATER-PROOFING MEMBER

CROSS REFERENCE TO RELATED APPLICATIONS

This application claims the priority of Japanese patent application JP2016-221980 filed on Nov. 15, 2016, the entire contents of which are incorporated herein.

TECHNICAL FIELD

The present invention relates to a water-proofing member.

BACKGROUND ART

A tubular water-proofing cover made of rubber or an elastomer that is attached to a terminal of an exterior member into which a high-voltage wire harness is inserted and made air-tight is disclosed in JP 2013-241143A. An air-permeable film is attached to a circumferential wall of this water-proofing cover, and air is allowed to flow into and out of the water-proofing cover via the air-permeable film. Accordingly, the pressure inside the water-proofing cover is adjusted, and the water-proofing cover is prevented from excessively bulging due to a rapid increase in temperature.

JP 2013-241143A is an example of related art.

SUMMARY

As a means for attaching the air-permeable film to the above-described water-proofing cover, an attachment tube portion is formed protruding from the circumferential wall of the water-proofing cover, and the air-permeable film is mounted to this attachment tube portion. However, the protrusion length of the attachment tube portion is short, and therefore there are the issues of the position of the air-permeable film being limited to being near the water-proofing cover, and the layout regarding the arrangement of the air-permeable film being highly constrained.

The present design was achieved based on circumstances such as those described above, and it is an object thereof to ease layout constraints regarding the arrangement of the air-permeable film.

The present design includes: a pair of elastic tubular connection portions individually connected in an air-tight manner to two housing members housing an electrical wire; an elastic tubular insertion portion that surrounds the electrical wire in a mode of connecting the pair of tubular connection portions to each other; and a bendable pipe-shaped extension portion that extends branching from the insertion portion, wherein an air-permeable film is provided on an extension end portion side of the pipe-shaped extension portion.

With this configuration, the position of the air-permeable film can be set as desired by bending and deforming the pipe-shaped extension portion, and thus a configuration with fewer constraints on layout regarding the arrangement of the air-permeable film can be realized.

EMBODIMENTS

It is preferable that the present design also includes: a tubular holding member that is more rigid than the pipe-shaped extension portion, and is fitted into the extension end portion of the pipe-shaped extension portion while holding the air-permeable film; and a binding member that is fastened to the extension end portion of the pipe-shaped extension portion, and fixes the holding member to the extension end portion of the pipe-shaped extension portion. With this configuration, when the binding member is fastened, the extension end portion of the pipe-shaped extension portion is sandwiched between the binding member and the outer circumferential surface of the more rigid holding member, and thus the holding member is reliably fixed to the extension end portion of the pipe-shaped extension portion.

It is preferable that the present design also includes an anchor portion that is formed integrated with the binding member and is attachable to another member. With this configuration, the position and orientation of the air-permeable film can stabilized by attaching the anchor portion to another member.

It is preferable that the present design also includes an accordion portion in the pipe-shaped extension portion, an outer circumferential surface and an inner circumferential surface of the accordion portion being formed in the shape of an accordion. With this configuration, there is no concern of the accordion portion collapsing even if bent with a large curvature, and thus the internal space of the insertion portion and the internal space of the extension end portion of the pipe-shaped extension portion can be constantly kept in a state of communication.

It is preferable that, in the present design, the accordion portion is only arranged in a region on the extension end portion side of the pipe-shaped extension portion. With this configuration, the orientation and position of the extension end portion, to which the air-permeable film is attached, of the pipe-shaped extension portion can be set as desired.

Embodiment 1

Embodiment 1 will be described below with reference to FIGS. 1 to 4. Note that, in the following description, regarding the front-back direction, the left side in FIGS. 1 to 4 is defined as the front. Regarding the up-down direction, the directions shown in FIGS. 1 to 4 define the upward direction and the downward direction as they are.

Figure 4:
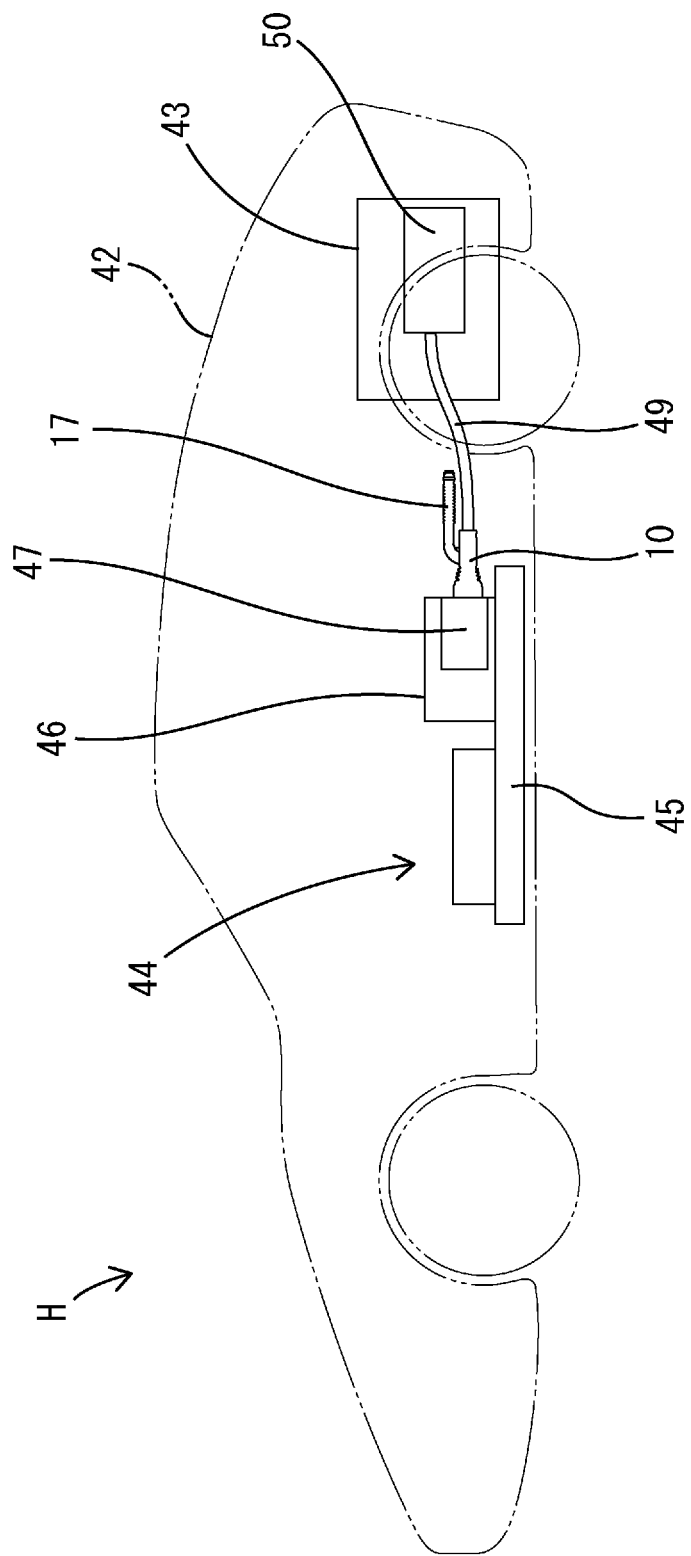
FIG. 4 is is a side view illustrating a usage mode of the water-proofing member.

A water-proofing member 10 according to the present embodiment is a member for water-proofing a portion of a routing path of a high-voltage electrical wire 40, which is a plurality of electrical wires 41 bundled together. As shown in FIG. 4, the electrical wire 40 in the present embodiment is routed in a hybrid vehicle H in which an engine 43 is provided in a rear portion of a vehicle body 42 and an IPU (Intelligent Power Unit) 44 that includes a battery 45 is arranged in the center portion in the front-back direction of the vehicle body 42. A front end portion of the electrical wire 40 is housed in a connector 48 of an inverter 47 in a PDU (Power Drive Unit) 46 arranged near the IPU 44 (see FIG. 2). The region of the electrical wire 40 rearward of the connector 48 is housed in a corrugated tube 49. The rear end portion of the electrical wire 40 is connected to a motor 50 arranged in the engine room of the vehicle body 42.

Figure 1:
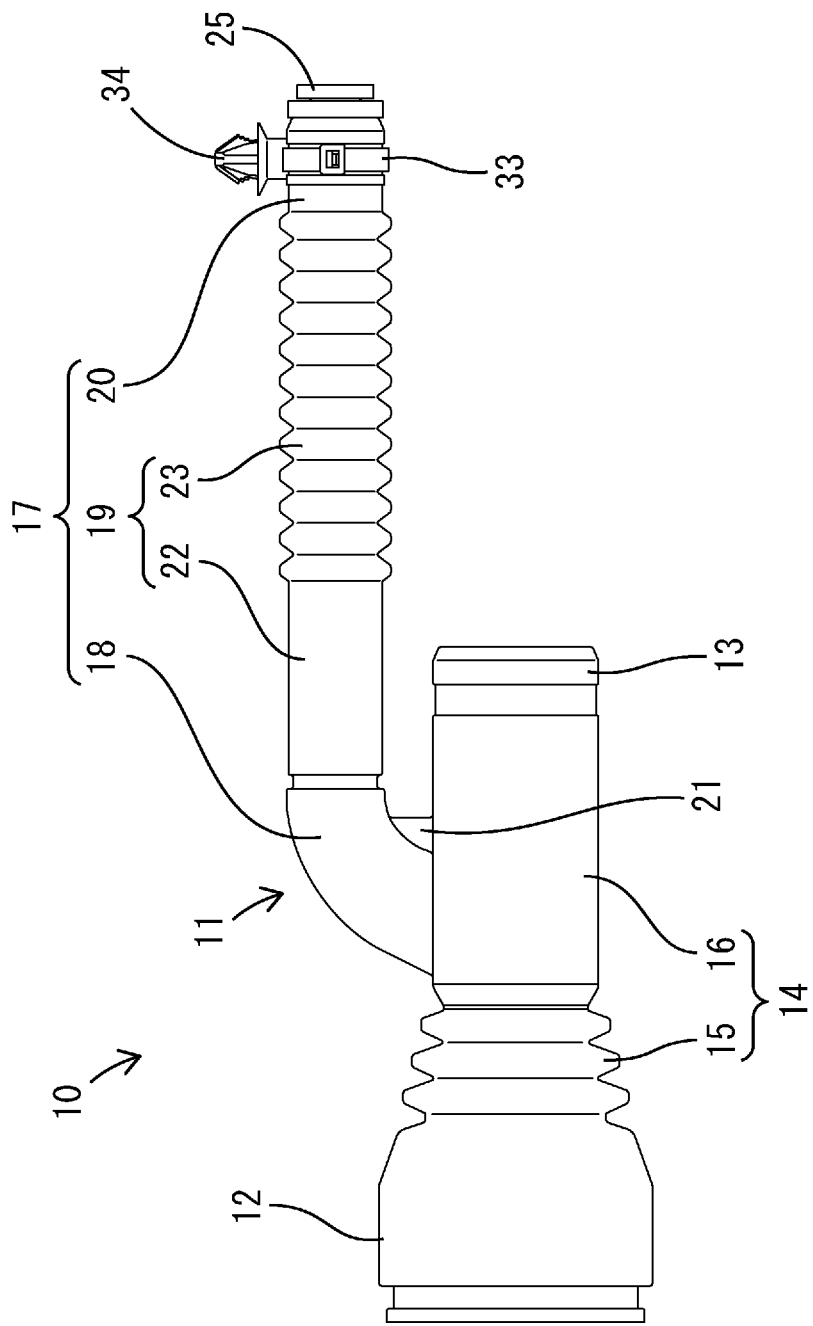
FIG. 1 is a side view of a water-proofing member according to Embodiment 1.
Figure 2:
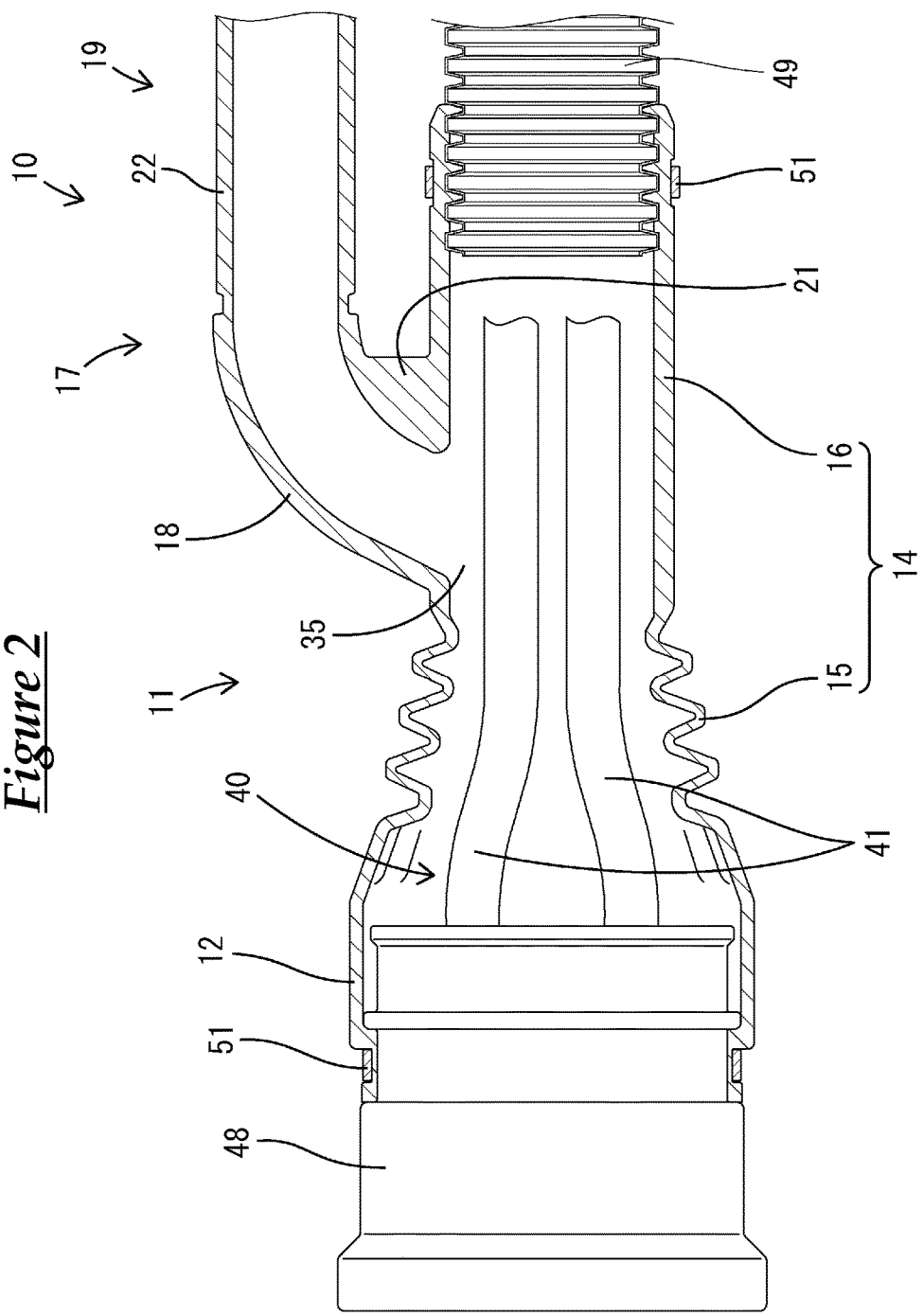
FIG. 2 is a lateral cross-sectional view illustrating a front end portion of the water-proofing member.
Figure 3:
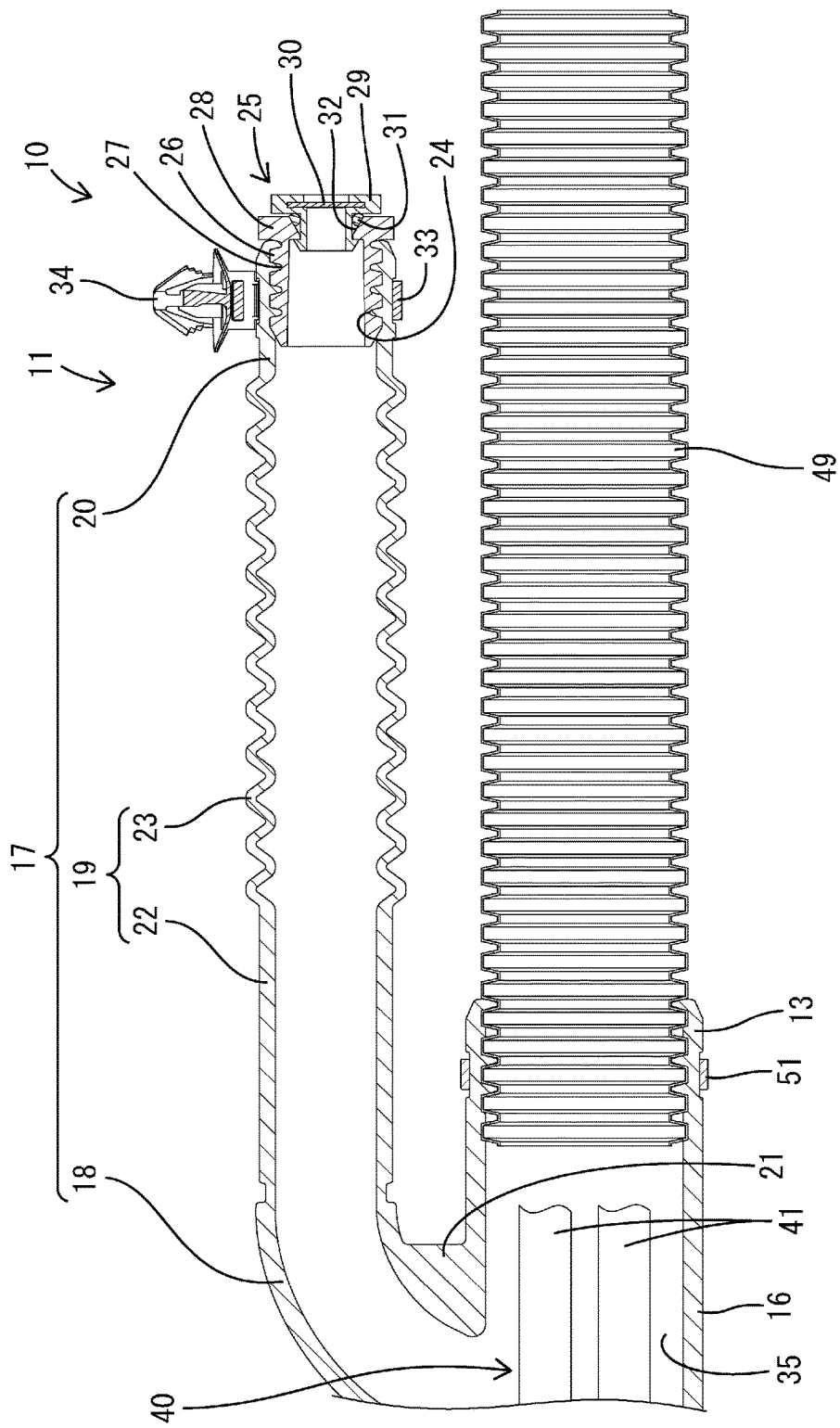
FIG. 3 is a lateral cross-sectional view illustrating a rear end portion of the water-proofing member.

The water-proofing member 10 includes an elastic branched body 11 made of an elastomer or the like, and an air-permeable film 30 that allows air to permeate but restricts liquid permeation. As shown in FIG. 1, the branched body 11 is a single unit formed by a front-side tubular connection portion 12 (tubular connection portion recited in Claims), a rear-side tubular connection portion 13 (tubular connection portion recited in Claims), an insertion portion 14, and a pipe-shaped extension portion 17.

The front-side tubular connection portion 12 is externally fitted onto the connector 48 of the inverter. The inner circumferential surface of the front-side tubular connection portion 12 and the outer circumferential surface of the connector 48 are brought into close contact with each other in an air-tight manner by a cable tie 51. The rear-side tubular connection portion 13 is externally fitted onto the front end portion of the corrugated tube 49. The inner circumferential surface of the rear-side tubular connection portion 13 and the outer circumferential surface of the corrugated tube 49 are brought into close contact with each in an air-tight manner by a cable tie 51. When the branched body 11 is in a free state in which it is not elastically deformed, the front-side tubular connection portion 12 and the rear-side tubular connection portion 13 are arranged coaxial to each other.

The insertion portion 14 is tubular in shape and joins the rear end of the front-side tubular connection portion 12 and the front end of the rear-side tubular connection portion 13 in an air-tight manner. When the branched body 11 is in a free state in which it is not elastically deformed, the insertion portion 14 is arranged coaxially with the front-side tubular connection portion 12 and the rear-side tubular connection portion 13. The front end region of the insertion portion 14 is an accordion-shaped tapered portion 15 with a diameter that gradually decreases toward the rear side, and the rear end region of the insertion portion 14 is a cylindrical portion 16 that has an approximately constant diameter for the entire length thereof. The accordion-shaped tapered portion 15 can be elastically deformed such that its axis in the front-back direction is curved.

The pipe-shaped extension portion 17 has a shape in which it branches from the insertion portion 14 and extends rearward in a cantilevered manner, and the internal space of the pipe-shaped extension portion 17 is in communication with the internal space of the insertion portion 14. The pipe-shaped extension portion 17 includes a curving portion 18, a linear pipe portion 19, and an extension end portion 20. The curving portion 18 has a shape where it is continuous with the outer circumferential surface of the front end of the cylindrical portion 16, and extends upward from the cylindrical portion 16 while being inclined rearward. Between the lower surface portion of the outer circumferential surface of the curving portion 18 and the upper surface portion of the outer circumferential surface of the cylindrical pipe 16, that is, at a region where the outer circumferential surface of the curving portion 18 and the outer circumferential surface of the cylindrical pipe 16 form an acute angle and oppose each other, a reinforcing portion 21 that has a mode of joining the curving portion 18 and the cylindrical pipe portion 16 is formed. Due to the reinforcing portion 21, the curving portion 18 is unlikely to become displaced relative to the cylindrical pipe portion 16.

The linear pipe portion 19 has a shape where it extends rearward from the rear end of the curving portion 18 in a cantilevered manner. When the branched body 11 is in a free state in which it is not elastically deformed, the linear pipe portion 19 is arranged above the cylindrical portion 16, and is in a non-contact positional relationship with and parallel with the cylindrical portion 16. The linear pipe portion 19 is formed by a fixed diameter portion 22 that has a constant diameter for the entire length thereof and is coaxial and continuous with the rear end of the curving portion 18, an accordion portion 23 that extends coaxially rearward from the rear end of the fixed diameter portion 22 and has a circular cross-section, and a cylindrical extension end portion 20 that extends coaxially from the rear end of the accordion portion 23. Each of the fixed diameter portion 22, the accordion portion 23, and the extension end portion 20 forms a part of the pipe-shaped extension portion 17.

The rear end of the fixed diameter portion 22 and the entire region of the accordion portion 23 are located rearward of the rear end of the rear-side tubular connection portion. Accordingly, the accordion portion 23 is arranged with the entire length thereof lined up parallel to the corrugated tube 49. The accordion portion 23 is a portion formed in the shape of an accordion where the outer circumferential surface and the inner circumferential surface thereof have a wave-like shape. The accordion portion 23 can be elastically deformed such that its axis is curved, and two portions on the inner circumferential surface of the accordion portion 23 will not come into close contact with each other even if the accordion portion 23 is bent with a comparatively small radius of curvature. Thus, even if the accordion portion 23 is bent and deformed, the internal space of the extension end portion 20 and the internal space of the insertion portion 14 are kept in a state of communication that allows the passage of air. The inner circumferential surface of the extension end portion 20 of the pipe-shaped extension portion 17 is provided with a plurality of ribs 24 that each extend in the circumferential direction and are spaced apart from each other in the axial direction of the extension end portion 20.

An air-permeable film unit 25 is attached to the extension end portion 20. The air-permeable film unit 25 is a member in which a tubular holding member 26 that is made of a synthetic resin more rigid than the branched body 11 and the air-permeable film 30 are made into one unit. The outer circumferential surface of the holding member 26 is provided with a plurality of locking grooves 27 that each extend in the circumferential direction and are spaced apart from each other in the axial direction of the holding member 26. An enlarged diameter portion 28 is provided on the outer circumferential surface of the rear end portion of the holding member 26. The air-permeable film 30 is formed integrated with a cap 29 through processing such as molding using a mold. The cap 29 is attached to the rear end portion of the holding member 26 via a seal ring 31, and an opening 32 of the rear end of the holding member 26 is closed in an air-tight manner.

The air-permeable film unit 25 is attached to the pipe-shaped extension portion 17 of the branched body 11 by fitting the holding member 26 from its front end portion into the extension end portion 20. When attaching the air-permeable film unit 25 to the pipe-shaped extension portion 17, the plurality of locking grooves 27 formed on the outer circumferential surface of the holding member 26 and the plurality of locking ribs 24 formed on the inner circumferential surface of the extension end portion 20 lock with each other in a state of close contact. Due to this locking, the air-permeable film unit 25 is restricted from coming off the extension end portion 20 in the rear direction.

Also, a tie-band (binding member recited in Claims) 33 made of a synthetic resin is wrapped around and fastened to the outer circumferential surface of the extension end portion 20. The tie-band 33 cannot be loosened once it has been fastened. The gap between the inner circumferential surface of the extension end portion 20 and the outer circumferential surface of the holding member 26 is kept in an air-tight state by fastening the tie-band 33. An anchor portion 34 is integrally formed on the tie-band 33. The anchor portion 34 has a shape that enables being elastically locked with a locking hole (not shown) provided in the vehicle body 42. By locking the anchor portion 34 to the locking hole, the position and orientation of the extension end portion 20 remains constant, and the position and orientation of the air-permeable film 30 is fixed.

The inside of the water-proofing member 10 and the inside of the corrugated tube 49 form an air-tight space 35 in which the electrical wire 40 is housed. There is concern that, if the air pressure in the air-tight space 35 rapidly increases due to a change in temperature or the like, the elastic branched body 11 will elastically deform and bulge and interfere with surrounding members and the like. However, according to the water-proofing member 10 of the present embodiment, the air in the air-tight space 35 can flow to the outside via the air-permeable film 30, and thus the air pressure in the air-tight space 35 can be kept roughly at the same pressure as the atmospheric pressure, and thus there is no concern of the branched body 11 excessively bulging. Also, if the air pressure in the air-tight space 35 decreases, outside air flows into the air-tight space 35 via a path that is the reverse of that described above, and thus the air pressure in the air-tight space 35 is kept at roughly the same pressure as the atmospheric pressure in this case as well.

The water-proofing member 10 in the present embodiment includes the branched body 11 that is a single elastic piece and the air-permeable film 30. The branched body 11 has the connector 48 that houses the front end portion of the electrical wire 40, and the front-side tubular connection portion 12 and the rear-side tubular connection portion 13 that are individually and air-tightly connected to the corrugated tube 49 that houses the longer region of the electrical wire 40. Also, the branched body 11 has a mode in which it connects the front-side and rear-side tubular connection portions 12 and 13 to each other, and has the tubular insertion portion 14 that surrounds the electrical wire 40, and the elastic pipe-shaped extension portion 17 that can be bent and deformed such that its axis is curved, and branches extending from the outer circumferential surface of the insertion portion 14. The air-permeable film 30 is attached to the extension end portion 20 of the pipe-shaped extension portion 17.

With this configuration, by bending and deforming the pipe-shaped extension portion 17, the position and orientation of the air-permeable film 30 can be set as desired. At this time, the accordion portion 23 can be elastically bent and deformed with a small curvature radius and can be elastically deformed so as to be stretched out. Also, the accordion portion 23 is only arranged in the region on the extension end portion 20 side of the pipe-shaped extension portion 17, but the fixed diameter portion 22 on the front end portion side of the pipe-shaped extension portion 17 undergoes almost no elastic deformation, and the orientation and position of the extension end portion 20 to which the air-penetrating film 30 is attached, of the pipe-shaped extension portion 17 can be freely set as desired.

Thus, according to the water-proofing member 10 of the present embodiment, a configuration with fewer constraints on the layout regarding the arrangement of the air-permeable film 30 can be employed. Furthermore, because there is no concern of the accordion portion 23 collapsing such that portions on the inner surface come into close contact with each other even when bent with a large curvature, the internal space of the insertion portion 14 and the corrugated tube 49 and the internal space (i.e. space facing air-permeable film 30) of the extension end portion 20 of the pipe-shaped extension portion 17 are constantly kept in a state of communication.

Also, the air-permeable film 30 is more rigid than the pipe-shaped extension portion 17, and is held in the tubular holding member 26 fitted into the extension end portion 20 of the pipe-shaped extension portion 17. Also, the tie-band 33 is fitted around and fastened to the extension end portion 20 of the pipe-shaped extension portion 17, and the holding member 26 is fixed to the extension end portion 20 of the pipe-shaped extension portion 17 by this tie-band 33. According to this configuration, when the tie-band 33 is fastened, the extension end portion 20 of the pipe-shaped extension portion 17 is sandwiched between the tie-band 33 and the more rigid outer circumferential surface of the holding member 26, and thus the holding member 26 can be reliably fixed to the extension end portion 20 of the pipe-shaped extension portion 17. Also, the anchor portion 34, which can be attached to the locking hole (other member) of the vehicle body 42, is formed as one unit with the tie-band 33 on the outer circumferential surface thereof, and thus the position and orientation of the air-permeable film 30 can be stabilized by locking and attaching the anchor portion 34 to the locking hole.

Other Embodiments

The present invention is not limited to the embodiment described above using the foregoing description and drawings, and embodiments such as the following are also encompassed in the technical scope of the present invention.

In the above-described embodiment, the air-permeable film is attached to the extension end portion of the pipe-shaped extension portion via the holding member, but the air-permeable film may be directly attached to the extension end portion of the pipe-shaped extension portion using insert molding or the like.

In the above-described embodiment, as a means of fixing the holding member to the extension end portion of the pipe-shaped extension portion, a binding member was fastened to the outer-circumferential surface of the extension end portion of the pipe-shaped extension portion, but an adhesive or a method using insert molding may be employed as the means of fixing the holding member to the extension end portion of the pipe-shaped extension portion.

In the above-described embodiment, the holding member that holds the air-permeable film is fitted into the extension end portion of the pipe-shaped extension portion, but the holding member may be fitted around the extension end portion of the pipe-shaped extension portion.

In the above-described embodiment, a tie-band that is made of a synthetic resin and cannot be loosened once fastened was used as the binding member, but the binding member may be a member that can be loosened after it has been fastened.

In the above-described embodiment, the anchor portion was formed integrally with the binding member, but the binding member may be a member without an anchor portion.

In the above-described embodiment, the accordion portion is only formed in a part of the pipe-shaped extension portion, but the accordion portion may be formed along the entire length of the pipe-shaped extension portion.

In the above-described embodiment, the accordion portion is arranged on the extension end portion side of the pipe-shaped extension portion, but the accordion portion may be arranged on the base end portion side (side that is opposite to the air-permeable film side, and closer to the insertion portion) of the pipe-shaped extension portion.

In the above-described embodiment, one accordion portion is formed in one pipe-shaped extension portion, but multiple accordion portions may be formed in one pipe-shaped extension portion.

In the above-described embodiment, an accordion portion is formed in the pipe-shaped extension portion, but the pipe-shaped extension portion may have a mode in which an accordion portion is not formed over the entire length thereof.

In the above-described embodiment, when the pipe-shaped extension portion is in a free state in which it is not elastically deformed, the greater region of the pipe-shaped extension portion, excluding the base end portion, extends substantially parallel to the corrugated tube, but the pipe-shaped extension portion in the free state may extend obliquely or orthogonally to the corrugated tube.

In the above-described embodiment, when the pipe-shaped extension portion is in a free state, the greater region of the pipe-shaped extension portion, excluding the base end portion, is mostly linear, but at least a portion of the region excluding the base end portion of the pipe-shaped extension portion may have a curved shape.

In the above-described embodiment, the two housing members are the connector and the corrugated tube, but the two housing members may also be a connector and a shield pipe, a corrugated tube and a corrugated tube, a shield pipe and a corrugated tube, and a shield pipe and a shield pipe.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Water-proofing member
12 Front-side tubular connection portion (tubular connection portion)
13 Rear-side tubular connection portion (tubular connection portion)
14 Insertion portion
17 Pipe-shaped extension portion
20 Extension end portion of pipe-shaped extension portion
23 Accordion portion
26 Holding member
30 Air-permeable film
33 Tie-band (binding member)
34 Anchor portion
40 Electrical wire
48 Connector (housing member)
49 Corrugated tube (housing member)

What is claimed is:

1. A water-proofing member comprising:
a pair of elastic tubular connection portions individually connected in an air-tight manner to two housing members housing an electrical wire;
an elastic tubular insertion portion that surrounds the electrical wire in a mode of connecting the pair of tubular connection portions to each other;
a bendable pipe-shaped extension portion that extends branching from the insertion portion;
an air-permeable film;
a tubular holding member that is more rigid than the pipe-shaped extension portion, and is fitted into an extension end portion of the pipe-shaped extension portion while holding the air-permeable film; and
a binding member that is fastened to the extension end portion of the pipe-shaped extension portion, and fixes the holding member to the extension end portion of the pipe-shaped extension portion.

2. The water-proofing member according to claim 1, further comprising an anchor portion that is formed integrated with the binding member and is attachable to another member.

3. A water-proofing member comprising:
a pair of elastic tubular connection portions individually connected in an air-tight manner to two housing members housing an electrical wire;
an elastic tubular insertion portion that surrounds the electrical wire in a mode of connecting the pair of tubular connection portions to each other;
a bendable pipe-shaped extension portion that extends branching from the insertion portion;
an air-permeable film that is provided on an extension end portion side of the pipe-shaped extension portion; and
an accordion portion in the pipe-shaped extension portion, an outer circumferential surface and an inner circumferential surface of the accordion portion being formed in the shape of an accordion.

4. The water-proofing member according to claim 3, wherein the accordion portion is only arranged in a region on the extension end portion side of the pipe-shaped extension portion.

* * * * *